(12) United States Patent
Umetani et al.

(10) Patent No.: US 9,916,683 B2
(45) Date of Patent: Mar. 13, 2018

(54) TECHNIQUES FOR APPROXIMATING THREE-DIMENSIONAL CURVES USING FOLDABLE BEAMS

(71) Applicant: AUTODESK, Inc, San Rafael, CA (US)

(72) Inventors: Nobuyuki Umetani, Zurich (CH); Ryan Michael Schmidt, Toronto (CA); Andrew O'Shea Sageman-Furnas, Ithaca, NY (US)

(73) Assignee: AUTODESK, INC., San Rafael, CA (US)

( * ) Notice: Subject to any disclaimer, the term of this patent is extended or adjusted under 35 U.S.C. 154(b) by 2 days.

(21) Appl. No.: 14/935,156

(22) Filed: Nov. 6, 2015

(65) Prior Publication Data

US 2017/0069127 A1 Mar. 9, 2017

Related U.S. Application Data

(60) Provisional application No. 62/214,853, filed on Sep. 4, 2015.

(51) Int. Cl.
*G06T 17/00* (2006.01)
*B33Y 50/00* (2015.01)

(52) U.S. Cl.
CPC .............. *G06T 17/00* (2013.01); *B33Y 50/00* (2014.12)

(58) Field of Classification Search
CPC ........... G05B 2219/34096; G05B 2219/34138; G05B 2219/34135; G05B 2219/34145; G06T 11/203; G06T 9/20
See application file for complete search history.

(56) References Cited

U.S. PATENT DOCUMENTS

2007/0250205 A1* 10/2007 Hu ...................... G06F 17/5004
  700/182
2009/0027398 A1* 1/2009 Frisken ................ G06T 11/203
  345/442

(Continued)

OTHER PUBLICATIONS

Yang et al., Control point adjustment for B-spline curve approximation, Computer-Aided Design 36 (2004) 639-652.*

(Continued)

*Primary Examiner* — Haixia Du
(74) *Attorney, Agent, or Firm* — Artegis Law Group, LLP

(57) ABSTRACT

In one embodiment of the present invention, a foldable beam generator produces a foldable beam polyline that approximates a three-dimensional (3D) space curve. The foldable beam generator optimizes the number and position of joints included in the foldable beam polyline to minimize differences between the foldable beam polyline and the 3D space curve while complying with one or more manufacturing constraints. Notably, the foldable beam generator designs each of the joints to act as a living hinge that closes to a fixed angle when heated and solidifies when cooled. By using the foldable beam polyline as a 3D digital model for manufacturing and subsequently applying heat to assemble the manufactured 3D object, defects and/or limitations of complex 3D objects typically associated with traditional manufacturing techniques may be reduced. In particular, support structures designed to buttress three-dimensional (3D) digital models during 3D printing may be minimized.

20 Claims, 4 Drawing Sheets

(56) References Cited

U.S. PATENT DOCUMENTS

| | | | | |
|---|---|---|---|---|
| 2013/0110237 | A1* | 5/2013 | Schaer | A61F 2/02 623/11.11 |
| 2014/0284832 | A1* | 9/2014 | Novikov | B29C 67/0088 264/40.1 |
| 2015/0202045 | A1* | 7/2015 | Early | A61F 2/28 700/97 |
| 2015/0223900 | A1* | 8/2015 | Wiebe, III | A61B 17/1764 703/11 |

OTHER PUBLICATIONS

An, B., Miyashita, S., Tolley, M., Aukes, D., Meeker, L., Demaine, E., Demaine, M., Wood, R., and Rus, D. 2014. "An end-to-end approach to making self-folded 3d surface shapes by uniform heating". In Proc. ICRA 2014, 1466-1473.

Bellman, R. 1961. "On the approximation of curves by line segments using dynamic programming". Commun. ACM 4, 6, 19 pages.

Bergou, M., Wardetzky, M., Robinson, S., Audoly, B., and Grinspun, E. 2008. "Discrete elastic rods". ACM Trans. Graph. 27, 3, 63:1-63:12.

Cheung, K., Demaine, E., Bachrach, J., and Griffith, S. 2011. "Programmable assembly with universally foldable strings (moteins)". IEEE Trans. Robotics 27, 4, 718-729.

Douglas, S. M., Dietz, H., Liedl, T., Hogberg, B., Graf, F., and Shih, W. M. 2009. "Self-assembly of dna into nanoscale three-dimensional shapes". Nature 459, 7245, (1 Page).

Mueller, S., Kruck, B., and Baudisch, P. 2013. "LaserOrigami: Laser-cutting 3D objects". In CHI '13 Extended Abstracts, 2851-2852.

Peraza-Hernandez, E. A., Hartl, D. J., Jr, R. J. M., and Lagoudas, D. C. 2014. "Origami-inspired active structures: a synthesis and review". Smart Mater. Struct. 23, 9, 094001.

Raviv, D., Zhao, W., Mcknelly, C., Papadopoulou, A., Kadambi, A., Shi, B., Hirsch, S., Dikovsky, D., Zyracki, M., Olguin, C., Raskar, R., and Tibbits, S. 2014. "Active printed materials for complex self-evolving deformations". Sci. Rep. 4.

Umetani, N., and Schmidt, R. 2013. "Cross-sectional structural analysis for 3d printing optimization". In SIGGRAPH Asia '13 Tech. Briefs, ACM, 5:1-5:4.

Zhou, Y. Sueda, S., Matusik, W., and Shamir, A. 2014. "Boxelization: Folding 3d objects into boxes". ACM Trans. Graph. 33, 4, 71:1-71:8.

* cited by examiner

TECHNIQUES FOR APPROXIMATING THREE-DIMENSIONAL CURVES USING FOLDABLE BEAMS

CROSS-REFERENCE TO RELATED APPLICATIONS

This application claims the benefit of U.S. provisional patent application titled, "FABRICATION OF COMPLEX THREE-DIMENSIONAL STRUCTURES BY MELTING," filed on Sep. 4, 2014 and having Ser. No. 62/214,853. The subject matter of this related application is hereby incorporated herein by reference.

BACKGROUND OF THE INVENTION

Field of the Invention

Embodiments of the present invention relate generally to three-dimensional printing and, more specifically, to techniques for approximating three-dimensional curves using foldable beams.

Description of the Related Art

A typical three-dimensional (3D) printer generates a 3D solid object based on a 3D printable digital model, such as a 3D mesh of triangles. In operation, the 3D printer creates the 3D object from bottom to top. For instance, if the 3D model were to represent a candy cane, then the 3D printer would print successive layers of material beginning with a layer corresponding to the bottom of the stem and ending with a layer corresponding to the top of the hook. To prevent un-supported layers (such as the hook of a candy-cane) from collapsing and/or drooping onto previously printed layers or the ground during the printing process, 3D printers typically enhance the 3D model around the un-supported layers with "support structures."

In general, support structures are designed to ensure the integrity of the material that forms the 3D object throughout the 3D printing process. In that vein, 3D printers oftentimes generate support structures in a different type of material than the material used to generate the geometries associated with the actual 3D object being printed. After the 3D printer generates the 3D object, a designer usually performs post-processing operations to remove the now-extraneous support structures and reveal the desired 3D object. For instance, the designer may break off or dissolve the support material.

One drawback to removing the support materials after printing a 3D object is that the associated post-processing techniques can cause perceivable defects in the 3D object. For example, if the support material is broken off, then rough edges may be apparent in the 3D object. And, if the support material is dissolved, then the color and/or texture of the 3D object may be uneven. Consequently, some designers modify the 3D model to reduce the amount of support material required during 3D printing.

In general, the amount and structure of the support material correlates to the number and significance of overhangs specified by the 3D model. Most 3D printers can print 3D objects with some amount of overhang without having to include support material. More specifically, each such 3D printer is associated with an overhang angle threshold, also known as the maximum draft angle. The overhang angle threshold is the maximum angle of a local surface patch relative to the horizontal print bed that the 3D printer is configured to print without adding support material to ensure the integrity of the 3D object during printing.

In one approach for reducing the amount of support required during 3D printing, the designer identifies which of the angles included in the 3D model exceed the overhang angle threshold. The designer then modifies the 3D model to reduce the magnitude of one or more of the identified overhang angles. The designer repeats this process until satisfied with the appearance of the 3D model. While this incremental adjustment process may yield acceptable results for simple 3D objects, adjusting complex 3D objects to reduce overhang angles without unacceptably distorting the desired shapes of the 3D objects can be tedious and quite time consuming. Further, even with a deliberate, careful approach to reducing the identified overhang angles, the remaining amount of support material and/or the modifications to the 3D objects are oftentimes still unacceptable from a design perspective.

As the foregoing illustrates, what is needed in the art are more effective techniques for reducing support materials generated during 3D printing.

SUMMARY OF THE INVENTION

One embodiment of the present invention sets forth a computer-implemented method for generating a foldable beam polyline for constructing a three-dimensional (3D) object. The method includes computing a first polyline that approximates a 3D curve included in the 3D object; verifying that the first polyline complies with a set of manufacturing constraints; computing a second polyline that approximates the 3D curve; verifying that the second polyline complies with the set of manufacturing constraints; and setting the foldable beam polyline equal to either the first polyline or the second polyline based on whether a difference between the first polyline and the 3D curve is less than a difference between the second polyline and the 3D curve.

One advantage of the disclosed approach is that the foldable beam polyline may be self-assembled into a final shape without defects that may be associated with standard manufacturing techniques. In particular, when 3D printing foldable beam polylines in a horizontal orientation, support materials are not required and, therefore, defects associated with the removal of support materials are avoided. Further, since foldable beam polylines may be selected to minimize the error between the foldable beam polylines and the 3D curves, the final shape may better represent the desired 3D object than a final shape generated using conventional, ad-hoc, self-assembly techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
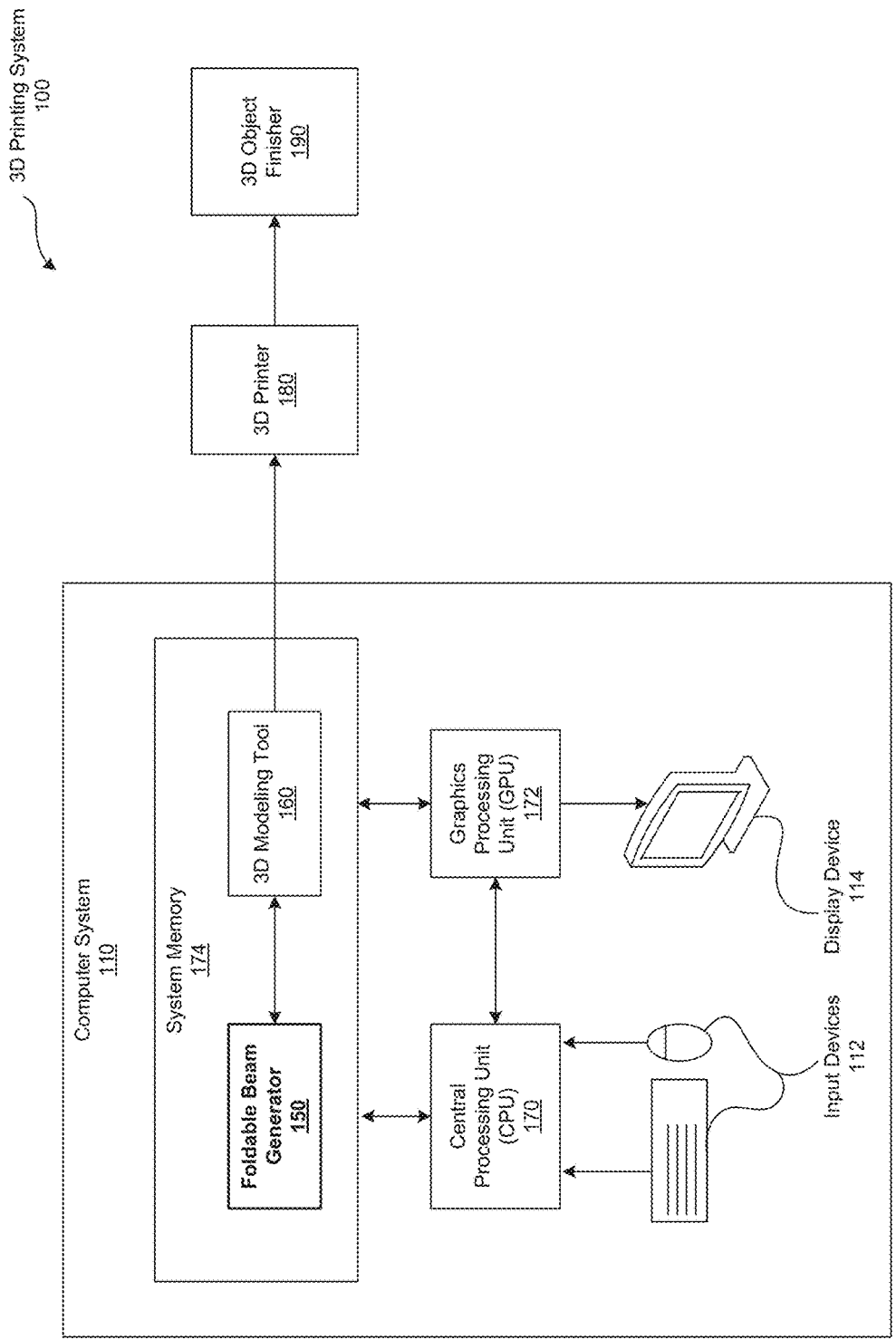
FIG. 1 is a conceptual illustration of a three-dimensional (3D) printing system configured to implement one or more aspects of the present invention.

FIG. 1 is a conceptual illustration of a three-dimensional (3D) printing system 100 configured to implement one or more aspects of the present invention. As shown, the 3D printing system 100 includes, without limitation, a computer system 110, a 3D printer 180, and a 3D object finisher 190.

The computer system 110 includes, without limitation, a central processing unit (CPU) 170, input devices 112, a graphics processing unit (GPU) 172, a display device 114, and a system memory 174. The CPU 170 receives input user input information from the input devices 112, such as a keyboard or a mouse. In operation, the CPU 170 is the master processor of the computer system 110, controlling and coordinating operations of other system components. In particular, the CPU 170 issues commands that control the operation of the GPU 172.

The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1 to form a single system. For example, the GPU 172 may be integrated with the CPU 170 and other connection circuitry on a single chip to form a system on chip (SoC).

The system memory 174 stores content, such as software applications and data, for use by the CPU 170 and the GPU 172. As shown, the system memory 174 includes, without limitation, a 3D modeling tool 160 and a foldable beam generator 150. The 3D modeling tool 160 and the foldable beam generator 150 are software applications that execute on the CPU 170, the GPU 172, or any combination of the CPU 170 and the GPU 172. Both the 3D modeling tool 160 and the foldable beam generator 150 facilitate 3D printing.

The 3D modeling tool 160 enables, without limitation, specification of a 3D model and subsequent modification of the 3D model. The 3D model describes a desired 3D solid object and may conform to any 3D printable format as known in the art. For instance in some embodiments the 3D model may capture unit normal and vertices that define the 3D solid object in the stereolithograpy format. In alternate embodiments, the 3D model may capture a 3D mesh of interconnected triangles that define the 3D solid object in the collaborative design activity (COLLADA) format. In alternate embodiments, the 3D model is created manually and the 3D modeling tool 160 is not included in the 3D printing system 100.

The 3D modeling tool 160 may be implemented in any technically feasible fashion. For instance, the 3D modeling tool 160 may include computer aided design (CAD) software. Such CAD software often includes a graphical user interface that converts designer input such as symbols and brush stroke operations to geometries in the 3D model. Alternatively the 3D modeling tool 160 may be a 3D scanner that analyzes an existing 3D solid object to create the 3D model as a digital template for creation of copies of the existing 3D solid object.

The 3D modeling tool 160 is configured to receive designer input information from input devices 112, such as a keyboard or a mouse. After the 3D modeling tool 160 processes the designer input information in conjunction with the 3D model, the 3D modeling tool 160 delivers pixels to the display device 114. The display device 114 may be any conventional cathode ray tube, liquid crystal display, light-emitting diode display, or the like. The 3D modeling tool 160 is configured to continuously repeat this cycle, enabling the designer to dynamically interact with the 3D model based on corresponding images on the display device 114.

As part of the 3D printing process, designers often "eyeball" the 3D model in an effort to estimate where the 3D modeling tool 160 is likely to insert support material to reduce the probability of the sagging during bottom-to-top 3D object creation. More specifically, designers may attempt to reduce overhang angles that require support material to ensure the integrity of the 3D object during the 3D printing process. However, for complex 3D objects, designers are often unable to adjust the 3D model to reduce overhang angles without unacceptable distorting the desired shape of the 3D object. For this reason the 3D printing system 100 is configured to approximate complex 3D shapes included in the 3D object via physical deformation of simpler shapes that the 3D printer 180 may manufacture with minimal support material.

In operation, the 3D modeling tool 160 represents portions of the 3D model as 3D space curves. For example, for a 3D model of a lamp, the 3D modeling tool 160 could represent the lamp shade as a simple 3D shape that does not include overhanging angles and the lamp base as a 3D space curve. The foldable beam generator 150 receives the 3D space curve and approximates the 3D space curve as a set of planar beams and joints, referred to herein as a "foldable beam polyline." The joints are thin portions of the 3D object which, when heated, temporarily become pliable, dynamic hinges that close to fixed angles that are defined by the shape of the joints and the orientation of the joints with respect to the planar beams. Because the portions of the planar beams surrounding the joints are thicker, when heated, such surrounding portions remain relatively rigid. When cooled, the joints become rigid, and the "self-assembly" of the 3D object is complete.

Notably, the foldable beam generator 150 optimizes the number, positions, closing angles, and orientation of the joints based on an evaluation metric that reflects how closely the self-assembled foldable beam polyline matches the 3D space curve. Further the foldable beam generator 150 ensures that the foldable beam polyline complies with manufacturing constraints associated with the 3D printer 180. Such manufacturing constraints include, without limitation, a minimum spacing between joints, a minimum closing angle, and a maximum closing angle.

One or more of the constraints may reflect the orientation in which the 3D model is printed. To minimize the limitations imposed by the constraints, the foldable beam polyline is typically manufactured lying flat on a horizontal print bed of the 3D printer 180, with the joint openings facing upwards or downwards. In some embodiments that implement such a "flat" printing orientation, the minimum closing angle may be as small as 20 degrees and the maximum closing angle may be as wide as 90 degrees. In alternate embodiments that implement a flat printing orientation, the minimum closing angle and/or the maximum closing angle may vary. In yet other embodiments, the foldable beam polyline is manufactured in a non-flat orientation. For example, in some embodiments, the foldable beam polyline may be manufactured in a vertical orientation with respect to the print bed of the 3D printer 180.

In alternate embodiments, the system memory 174 may not include the 3D modeling tool 160 and/or the foldable beam generator 150. In other embodiments, the 3D modeling tool 160 and/or the foldable beam generator 150 are integrated into any number (including one) of software applications. In some embodiments, the 3D modeling tool 160 and/or the foldable beam generator 150 may be provided as an application program (or programs) stored on computer readable media such as a CD-ROM, DVD-ROM, flash memory module, or other tangible storage media.

The components illustrated in the computer system 110 may be included in any type of computer system 110, e.g., desktop computers, server computers, laptop computers, tablet computers, and the like. Additionally, software applications illustrated in computer system 110 may execute on distributed systems communicating over computer networks including local area networks or large, wide area networks, such as the Internet. Notably, the 3D modeling tool 160 and the foldable beam generator 150 described herein are not limited to any particular computing system and may be adapted to take advantage of new computing systems as they become available.

It will be appreciated that the computer system 110 shown herein is illustrative and that variations and modifications are possible. The number of CPUs 170, the number of GPUs 172, the number of system memories 174, and the number of applications included in the system memory 174 may be modified as desired. Further, the connection topology between the various units in the computer system 110 may be modified as desired. In some embodiments, any combination of the CPU 170, the GPU 172, and the system memory 174 may be replaced with any type of distributed computer system or cloud computing environment, such as a public or a hybird cloud.

The 3D printer 180 is any device capable of additively printing a 3D object based on the 3D model. Notably, any amount (including none or all) of the 3D model may correspond to any number of foldable beam polylines. The 3D printer 180 may be configured to build-up any type of 3D object in any technically feasible fashion. For instance, in some embodiments, the 3D printer 180 extrudes plastic, and the 3D printer 180 may be configured to print plastic replacement parts for tools based on blueprints expressed as 3D models. In other embodiments, the 3D printer 180 generates live cells, and the 3D printer 180 may be configured to print organs, such as kidneys. Support material ensures that each successive layer of the 3D object receives the support required to prevent gravity-induced defects, hereby ensuring the integrity of the 3D object throughout the 3D printing process.

After the 3D printer 180 generates the top layer of the 3D object, any support material is unnecessary and typically detracts from the aesthetic appeal and/or functionality of the 3D object. The 3D object finisher 190 performs removal operations that separate the support material from the 3D object. In some embodiments, the 3D object finisher 190 may include a human who manually cuts away or peels off the support material. In other embodiments, the 3D support material is water soluble, and the 3D object finisher 190 may include a bath of water.

Irrespective of the implementation of the 3D object finisher 160, the areas where support material are removed from the 3D object often exhibit undesired defects, such as rough textures or small marks on the surface of the 3D object. Again, the foldable beam generator 180 enables designers to reduce or eliminate the extent of the support material. Consequently, the overall quality of the 3D object is increased compared to 3D objects generated using conventional 3D printing systems.

After the 3D object finisher 190 removes any support material, the 3D object finisher 190 performs self-assembly operations that "fold" the foldable beam polylines, creating the final 3D object. In some embodiments, the 3D object finisher 190 is a human who manually applies heat to the 3D object. The 3D object finisher 190 may apply a variety of forces to the 3D object to ensure that the joints close. For example, the 3D object finisher 190 could orient the 3D object to allow gravity to close the joints. In some embodiments, the 3D object finisher 190 may apply either direct or indirect physical force to close the joints. For example, in some embodiments, the 3D object finisher 190 may strategically apply heat-shrink materials to the 3D object. In such embodiments, when the 3D object finisher 190 applies heat, the heat-shrink material causes the joints to close.

As persons skilled in the art will recognize, the self-assembly techniques implemented in the 3D printing system 100 may enable fabrication of objects that conventional 3D printing systems are unable to satisfactorily produce due to inaccessible support structures. Further, the 3D printing system 100 may be designed to optimize strength and/or compliance along certain force directions by orienting the planar filament lines of the foldable beam polylines. For example, because in-plane filament strands are typically stronger than inter-layer bonds, the 3D printing system 100 may be configured to generate the foldable beam polylines in a flat printing orientation to maximize the strength of the 3D object.

It will be appreciated that the system shown herein is illustrative and that variations and modifications are possible. The connection topology, including the number and arrangement of the 3D modeling tool 160, the foldable beam generator 150, the 3D printer 180, and the 3D object finisher 190, may be modified as desired. In certain embodiments, one or more components shown in FIG. 1 may not be present. For instance, the 3D modeling tool 160 could be eliminated, and the foldable beam generator 150 could receive a manually created file as input. Lastly, the functionality included in the 3D modeling tool 160 and the foldable beam generator 150 may be implemented in any combination of software and hardware units.

In general, the foldable beam generator 150 implements a variety of techniques that enable generation of high quality self-assembled objects. Notably, the foldable beam generator 150 computes a foldable beam polyline to approximate a 3D space curve while satisfying any number of fabrication constraints and optimizing any evaluation metric. Accordingly, in alternate embodiments, the inventive concepts described herein may be applied to design processes that do not include fabrication using the 3D printer 180.

For example, in some embodiments the 3D printing system 100 may be replaced with a PVC pipe fabrication system. The PVC pipe fabrication system may include, without limitation, the computer system 110, a robotic sliding miter saw, and the 3D object finisher 190. The computer system 110 may include the foldable beam generator 150 and the 3D modeling tool 160.

In operation, the foldable beam generator 150 may generate a foldable beam polyline and the 3D modeling tool may generate a 3D jig based on the foldable beam polyline. The robotic sliding miter saw may be configured to cut notches in a PVC pipe at the angles specified by the 3D jig. More specifically, in some embodiments, the robotic sliding miter saw may include an actuator that correctly positions the PVC pipe under the saw blade and an actuator that spins the PVC pipe such that the PVC pipe is currently oriented. The 3D object finisher 190 may be a human that applies heat uniformly to the PVC pipe and ensures that the notches fully close. Significantly, since the foldable beam generator 150 precisely computes the closing angles of the joints, the quality of 3D objects manufactured using the foldable beam generator 150 typically exceeds the quality of traditional and ad-hoc PVC pipe fabrication systems.

Although the foldable beam generator 150 is described herein in the context of the 3D printing system 100, the techniques described herein may be modified to reflect other manufacturing processes. For example, as persons skilled in the art will recognize, in a PVC pipe fabrication system, the thickness of the PVC pipe wall could define the thickness of the joint, and the constraints could differ from those associated with the 3D printer 180. In particular, fabrication constraints could ensure that the bend PVC pipe does not collide with the robotic sliding miter saw. In general, many modifications and variations will be apparent to those of ordinary skill in the art without departing from the scope and spirit of the described embodiments.

Generating Foldable Beam Polylines

Figure 2:
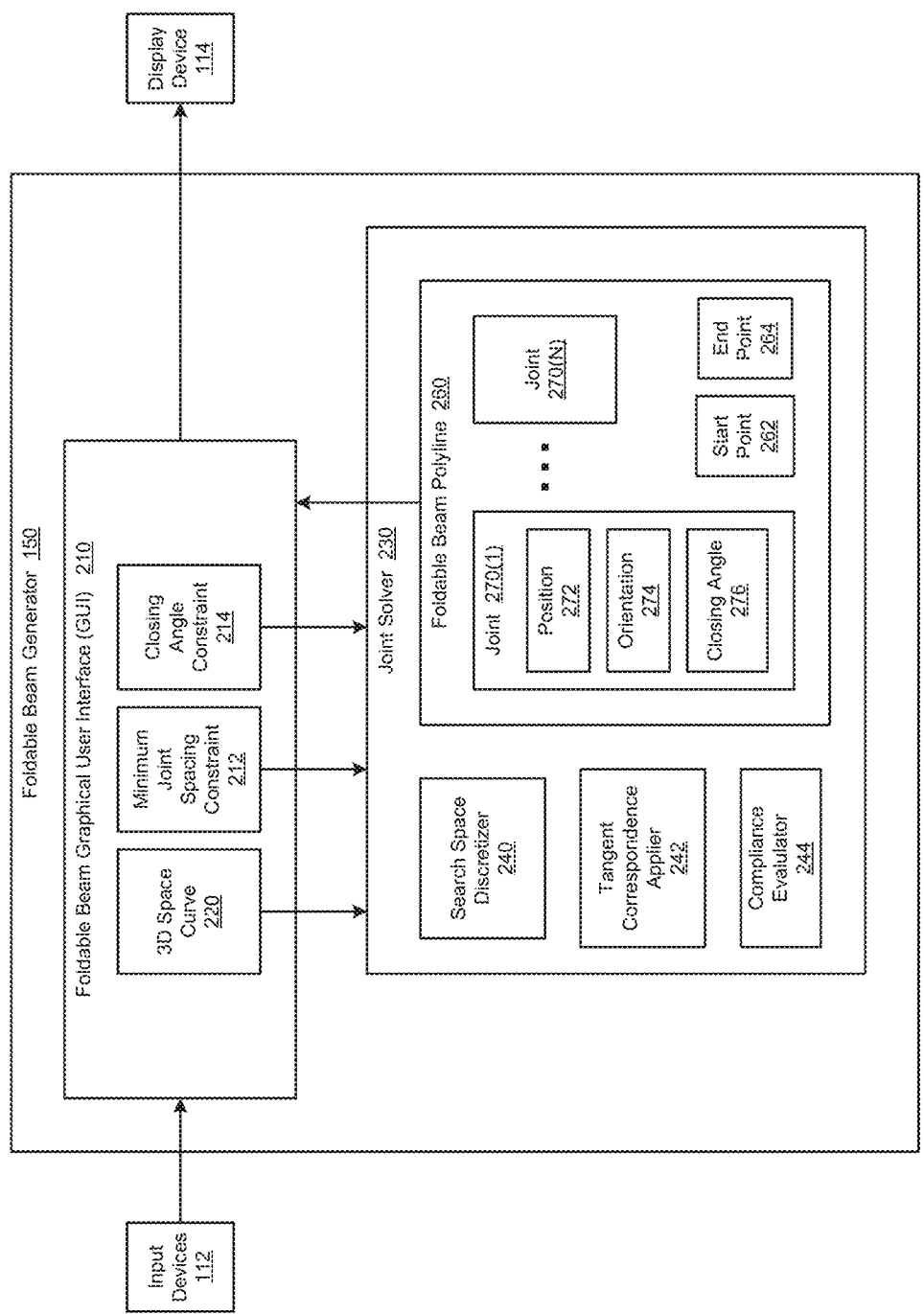
FIG. 2 is a more detailed illustration of the foldable beam generator of FIG. 1, according to various embodiments of the present invention.

FIG. 2 is a more detailed illustration of the foldable beam generator 150 of FIG. 1, according to various embodiments of the present invention. As shown, the foldable beam generator 150 includes, without limitation, a graphical user interface (GUI) 210 and a joint solver 230. As shown in FIG. 1, the foldable beam generator 150 is included in the system memory 174 of the computer system 100 and executes on the CPU 170 and/or the GPU 172.

In operation, the foldable beam GUI 210 is configured to receive designer input information from the input devices 112 and process the designer input information in conjunction with the joint solver 230. As the foldable beam GUI 210 and/or the joint solver 230 process the designer input, the foldable beam GUI 210 delivers pixels to the display device 114. The foldable beam GUI 210 is configured to continuously repeat this cycle, enabling the designer to dynamically interact with the joint solver 230 based on corresponding images on the display device 114.

In alternate embodiments, any portion of the functionality implemented in the foldable beam GUI 210 may be implemented in the 3D modeling tool 160 as part of a 3D modeling GUI. In yet other embodiments, the foldable beam GUI 210 may be eliminated and any portion of the functionality implemented in the foldable beam GUI 210 may be implemented in the joint solver 230 and/or the 3D modeling tool 160 in any combination. Further, in some embodiments, the foldable beam GUI 210 may be replaced with any interface that enables the foldable beam generator 150 to receive input data. For example, the foldable beam GUI 210 may be replaced with an application programming interface (API).

As shown, the foldable beam GUI 210 includes, without limitation, a three dimensional (3D) space curve 220, a minimum joint spacing constraint 212, and a closing angle constraint 214. The 3D space curve 220 represents a centerline of the target 3D object and may be entered in any technically feasible fashion. For example, in some embodiments, the foldable beam GUI 210 may receive brush strokes entered via a mouse or touch screen and, based on the brush strokes, generate the 3D space curve 220. In other embodiments, the foldable beam GUI 210 may receive one or more equations that describe the 3D space curve 220. The 3D space curve 220 may be described in any technically feasible fashion and in any format. For example, the space curve 220 "P" could include an arc length parameter $0<=s<=s_{end}$, a position parametrization $P(s)$, and a unit tangent parameterization $t(s)=dp/ds$. As referred to herein, the arc length parameter p is the distance along the 3D space curve 220 from the starting position of the 3D space curve 220 to a position p along the 3D space curve 220.

The minimum joint spacing constraint 212 specifies an minimum spacing between joints. In general, the minimum joint spacing constraint 212 ensures that neighboring joints do not collide with each other. In some embodiments, the minimum joint spacing constraint 212 may specify that half the closing width of a joint is less than half the arc length parameter of the smallest neighboring segment of the planar beam. As referred to herein, a segment is the portion of a planar beam between two joints. For example, suppose that the maximum distance from the cross section of the planar beam to the centerline of the planar beam were r. Further, suppose that the $i^{th}$ joint had a closing angle of $\theta_i$, the arc length parameter of the $i^{th}$ joint was $s_i$, the arc length parameter of the $(i-1)^{th}$ joint was $s_{(i-1)}$, and the arc length parameter of the $(i+1)^{th}$ joint was $s_{(i+1)}$. In such a scenario, the minimum joint spacing constraint 212 could be $r \times |\tan(\theta_i/2)| < \min\{(s_i - s_{(i-1)}/2), (s_{i+1} - s_{(i)}/2)\}$.

The closing angle constraint 214 specifies an acceptable range of closing angles for the joints. Typically, the closing angle constraint 214 is defined in conjunction with a printing orientation and with respect to a print bed. For example, the 3D object could be manufactured lying flat on a horizontal print bed of the 3D printer 180, with the joint openings facing upwards or downward. In such a scenario, the closing angle constraint 214 could be the range 20°-90° with respect to the horizontal print bed. In alternate embodiments, the closing angle constraint 214 may be replaced with an opening angle constraint 214 that defines an acceptable range for the opening angles for the joints.

After the foldable beam GUI 210 determines the 3D space curve 220, the minimum joint spacing constraint 212, and the closing angle constraint 214, the joint solver 230 generates a foldable beam polyline 260. More specifically, the joint solver 230 generates an optimized foldable beam polyline 260 to approximate the 3D space curve 220 while complying with the minimum joint spacing constraint 212 and the closing angle constraint 214. The foldable beam polyline 260 includes, without limitation, a start point 262, an end point 264, and any number (including zero) of joints 270. Each of the joints 270 includes, without limitation, a position 272, an orientation 274, and a closing angle 276. The joint solver 230 includes, without limitation, a search space discretizer 240, a tangent correspondence applier 242, and a compliance evaluator 244.

As persons skilled in the art will recognize, since the 3D space curve 220 is a continuous function, the search space could be theoretically defined as an infinite set and the amount of time required to identify the optimized foldable beam polyline 260 could be unacceptable long. To enable the joint solver 230 to determine an optimized solution in an acceptable amount of time, the search space discretizer 240 is configured to generate a bounded search space.

More specifically, the search space discretizer 240 defines a finite set of configurations for the number and the positions 272 of the joints 270 included in the foldable beam polyline 260. In operation, the search space discretizer 240 implements a maximum number of joints. The search space discretizer 240 may determine the maximum number of joints in any technically feasible fashion. In some embodiments, the search space discretizer 240 may determine the maximum number of joints based on the length of the 3D space curve 220 and the minimum joint spacing constraint 212. In other embodiments, the foldable beam GUI 210 may determine the maximum number of joints based on user input and then transmit the maximum number of joints to the search space discretizer 240.

Upon receiving the 3D space curve 220, the search space discretizer 240 performs sampling operations on the 3D space curve 220 to generate a set of discrete arc lengths. For each discrete arc length, the search space discretizer 240 determines a corresponding potential position 272 of the joints 270 along the foldable beam polyline 260. In alternate embodiments, the search space discretizer 240 may generate the potential positions 272 of the joints 270 in any technically feasible fashion. Subsequently, the search space discretizer 240 generates the search space based on the potential number of the joints 270 and the potential positions 272 of each of the joints 270. In particular, for each combination of the potential number of the joints 270 and the potential positions 272 of each of the joints 270, the search space discretizer 240 generates a configuration and includes the configuration in the search space.

For example, suppose that the arc length of the 3D space curve 220 was $s_{end}$, the maximum number of the joints 270 was N, and a large positive integer that reflected the sampling granularity was M. In such an embodiment, the search space discretizer 240 could generate configurations included in the search space based on the following range restrictions: the potential number of the joints 270 ranges from $0 <= i <= N$ and the potential positions 272 of each of the joints 270 ranges from $\{j \times s_{end} M\}$ where $j = \{0, 1, 2, \ldots M\}$.

After the search space discretizer 240 generates the search space, the joint solver 230 implements dynamic programming techniques to select the configuration included in the search space that optimally approximates the 3D space curve 220. In general, the joint solver 230 selects a configuration and the tangent correspondence applier 242 generates the foldable beam polyline 260 corresponding to the selected configuration. Subsequently, the compliance evaluator 244 deterministically evaluates the quality of the foldable beam polyline 260. The joint solver 230 then selects another configuration included in the search space and, together, the tangent correspondence applier 242 and the compliance evaluator 244 process the newly selected configuration. The joint solver 230 continues in this manner until the joint solver 230 has processed the entire search space as per the implemented dynamic programming techniques. From the set of foldable beam polylines 260 associated with the processed configurations, the joint solver 230 then sets the optimized foldable beam polyline 260 equal to the foldable beam polyline 260 that best approximates the 3D space curve 220.

In operation, the tangent correspondence applier 235 computes a foldable beam polyline 260 that approximates the 3D space curve 220 based on tangent correspondences. In particular, the tangent correspondence applier 235 sets the start point 262 equal to the start point of the 3D space curve 220 and sets the end point 264 such that the total length of the foldable beam polyline 260 equals the total length of the 3D space curve 220. Subsequently, based on the total number of the joints 270 and the positions 272 of the joints 270 included in the selected configuration, the tangent correspondence applier 235 determines the orientations 274 and the closing angles 276 to approximate the 3D space curve 220 based on tangent correspondence. More precisely, the joint solver 230 computes the orientations 274 and the closing angles 276 such that the tangent of the foldable beam polyline 260 at the midpoint of each segment equals the tangent of the 3D space curve 220 at the corresponding arc length parameter of the 3D space curve 220.

The joint solver 230 may compute the orientations 274 and the closing angles 276 in any technically feasible fashion. For example, suppose that the space curve 220 "P" included an arc length parameter $0 <= s <= s_{end}$, a position parametrization $P(s)$ where $p(0)$ was the start point of the space curve 220, and a unit tangent parameterization $t(s) = dp/ds$. Further, suppose that the foldable beam polyline 260 "Q" was represented as $\{q_0, q_1, q_2, \ldots, q_N, q_{N+1}\}$, where N was the number of joints, $q_0$ was the start point 262, and $q_{N+1}$ was the end point 264. To ensure that the foldable beam polyline 260 "Q" was in tangent correspondence with the space curve 220 "P," the tangent correspondence applier 235 could determine the orientations 274, and the closing angles 276 for the N joints 270 such that the tangent corresponds equation $(q_{i+1} - q_i)/(s_{i+1} - s_i) = t((s_i + s_{i+1})/2) = t_{i+1/2}$ was satisfied.

Notably, in the example outlined above, the joint solver 230 could determine the orientations 274 and the closing angles 276 by solving the re-written tangent correspondence equation $q_{i+1} = q_i + (s_{i+1} - s_i) \times t_{i+1/2}$ from $q_o = p(0)$. Accordingly, for each of the joints 270, the joint solver 230 could set the opening angle 272 equal to arc $\cos(t_{i-1/2} \cdot t_{i+1/2})$. Further, the joint solver could set the orientation 274 equal to a tan $2(\omega_i \cdot e^y_i, \omega_i \cdot e^x_i)$ where the hinge axis $\omega_i$ equals $t_{i-1/2} \times t_{i+1/2}$ and the frame is denoted by $(e^x_i, e^y_i, e^z_i = t_{i+1/2})$.

After the joint solver 230 determines the orientations 274 and the closing angles 276 for the selected configuration, the compliance evaluator 244 evaluates the foldable beam polyline 260 to determine whether the foldable beam polyline 260 complies with the minimum joint spacing constraint 212 and the closing angle constraint 214. If the compliance evaluator 244 determines that the foldable beam polyline 260 does not comply with the minimum joint spacing constraint 212 or the closing angle constraint 214, then the joint solver 230 no longer considers the selected configuration as a potential solution. If, however, the compliance evaluator 244 determines that the foldable beam polyline 260 complies with the minimum joint spacing constraint 212 and the closing angle constraint 214, then the compliance evaluator 244 calculates the value of one or more evaluation metrics that reflect how closely the foldable beam polyline 260 matches the 3D space curve 220.

The compliance evaluator 244 may implement any number and type of evaluation metrics in any technically feasible fashion. In some embodiments, the compliance evaluator 244 may calculate the value of an error function that reflects the average spatial deviation of the foldable beam polyline 260 from the 3D space curve 220, such as $h(s, t) = \int \|p(s) - q(s)\|^2 \, ds$. In other embodiments, the compliance evaluator 244 may calculate the value of a cost function that reflects the maximum spatial deviation of the foldable beam polyline 260 from the 3D space curve 220.

After the joint solver 230 has finished processing the search space as per the implemented dynamic programming techniques, the joint solver 230 performs comparison operations to determine which of the foldable beam polylines 260 is associated with the optimal value of the evaluation metric. Notably, the joint solver 230 does not perform comparison operations for "invalid" configurations for which the foldable beam polyline 260 violates one or more of the minimum joint spacing constraint 212 and the closing angle constraint 214. For example, the joint solver 230 may compare the average spatial error of the foldable beam polyline 260 with respect to the 3D space curve 220 for each valid configuration, and select the foldable beam polyline 260 associated with the minimum average spatial error as the optimized foldable beam polyline 260.

The joint solver 230 then transmits the optimized foldable beam polyline 260 to the foldable beam GUI 210 for display purposes. In alternate embodiments, the joint solver 230 may communicate the optimized foldable beam polyline 260 in any technically feasible fashion. For example, the joint solver 230 may store the optimized foldable beam polyline 260 in a designated memory location.

In some alternate embodiments, the joint solver 230 may maintain a currently optimized foldable beam polyline 260. As part of evaluating each selected configuration, the joint solver 230 may compare the value of the evaluation metric of the foldable beam polyline 260 of the selected configuration to the value of the evaluation metric of the currently optimized foldable beam polyline 260. If the joint solver 230 determines that the value of the evaluation metric of the selected configuration is preferable to the value of the evaluation metric of the currently optimized foldable beam polyline 260, then the joint solver 230 may set the currently optimized foldable beam polyline 260 to the foldable beam polyline 260 of the selected configuration. If, however, the joint solver determines that the value of the evaluation metric of the selected configuration is not preferable to the value of the evaluation metric of the currently optimized foldable beam polyline 260, then the joint solver 230 may discard the selected configuration.

Figure 3:
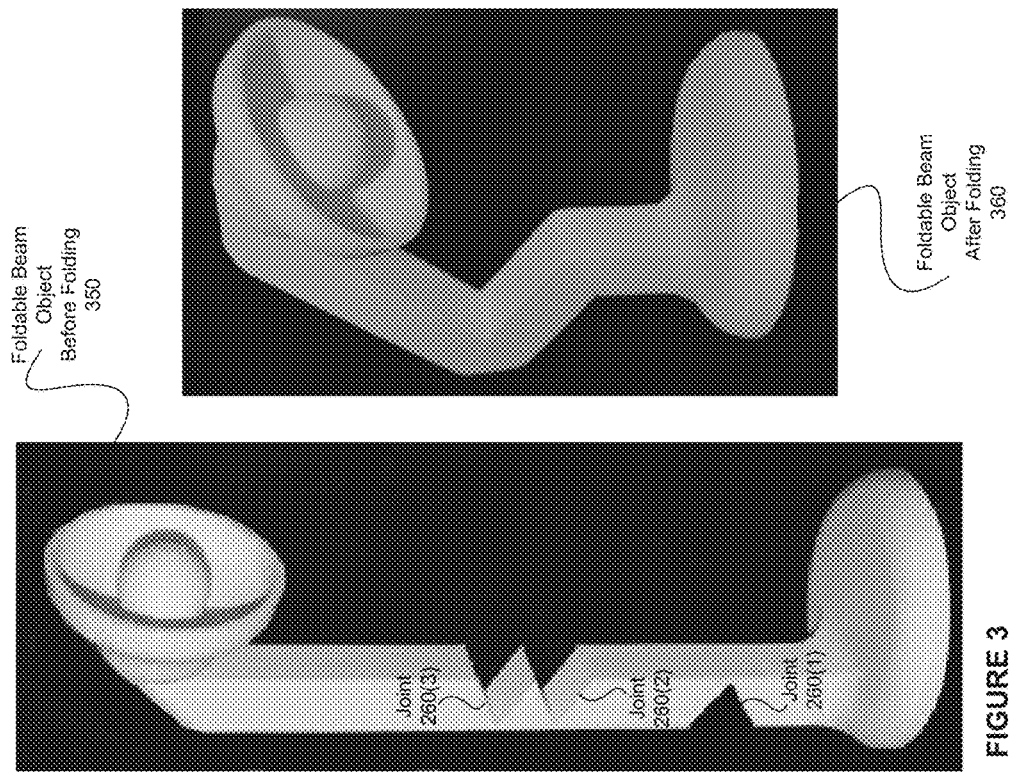
FIG. 3 is an example of a foldable beam object, according to various embodiments of the present invention.
Figure 3:
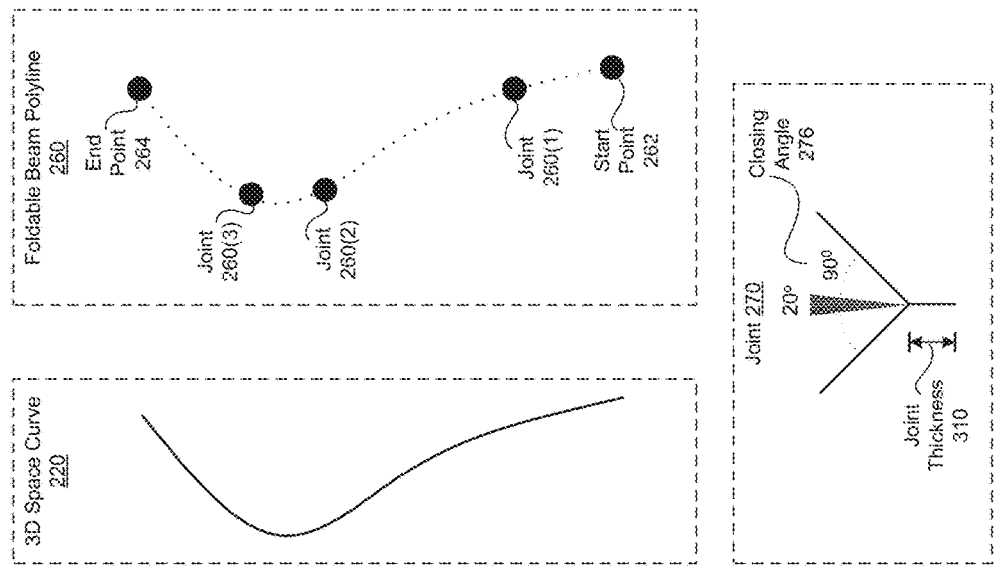

FIG. 3 is an example of a foldable beam object, according to various embodiments of the present invention. The context of FIG. 3 is that the joint solver 230 generates the foldable beam polyline 260 based on the 3D space curve 220. The 3D modeling tool 160 generates a 3D model that includes the foldable beam polyline 260. The 3D printer 180 then manufactures a foldable beam object before folding 350 based on the 3D model. Subsequently, the 3D object finisher 190 applies heat to the foldable beam object before folding 350, the joints 260 close, and the 3D object finisher 190 removes the heat. After the 3D object finisher 190 removes the heat, a foldable beam object after folding 360 solidifies into a lamp.

As shown, the shape of the foldable beam polyline 260 approximates the shape of the 3D space curve 220. Notably, the foldable beam polyline 260 include the start point 262, three joints 260(1-3), and the endpoint 264. The foldable beam polyline 260 complies with the minimum joint spacing constraint 212 and the closing angle constraint 214. As depicted, the closing angle 276 of each of the joints 270 lies between 20° and 90°. Further, a joint thickness 310 that defines the minimum thickness of the beam at the joint 270 is set to a predetermined value based on the cross section of the beam. In general, the time required for the joints to close upon application of heat correlates to the joint thickness 310.

The foldable beam object before folding 350 includes the foldable beam polyline 260 that represents the lamp base and a lamp shade. Notably, the lamp base reflects the foldable beam polyline 260, and includes the three joints 260(1-3). In a complementary fashion, the lamp base included in the foldable beam object after folding 360 reflects the 3D space curve 220. Because the foldable beam generator 150 models the lamp base as the foldable beam polyline 260, no support material is generated and, consequently, flaws attributable to removal of support material are not present in the foldable beam object after folding 360.

Figure 4:
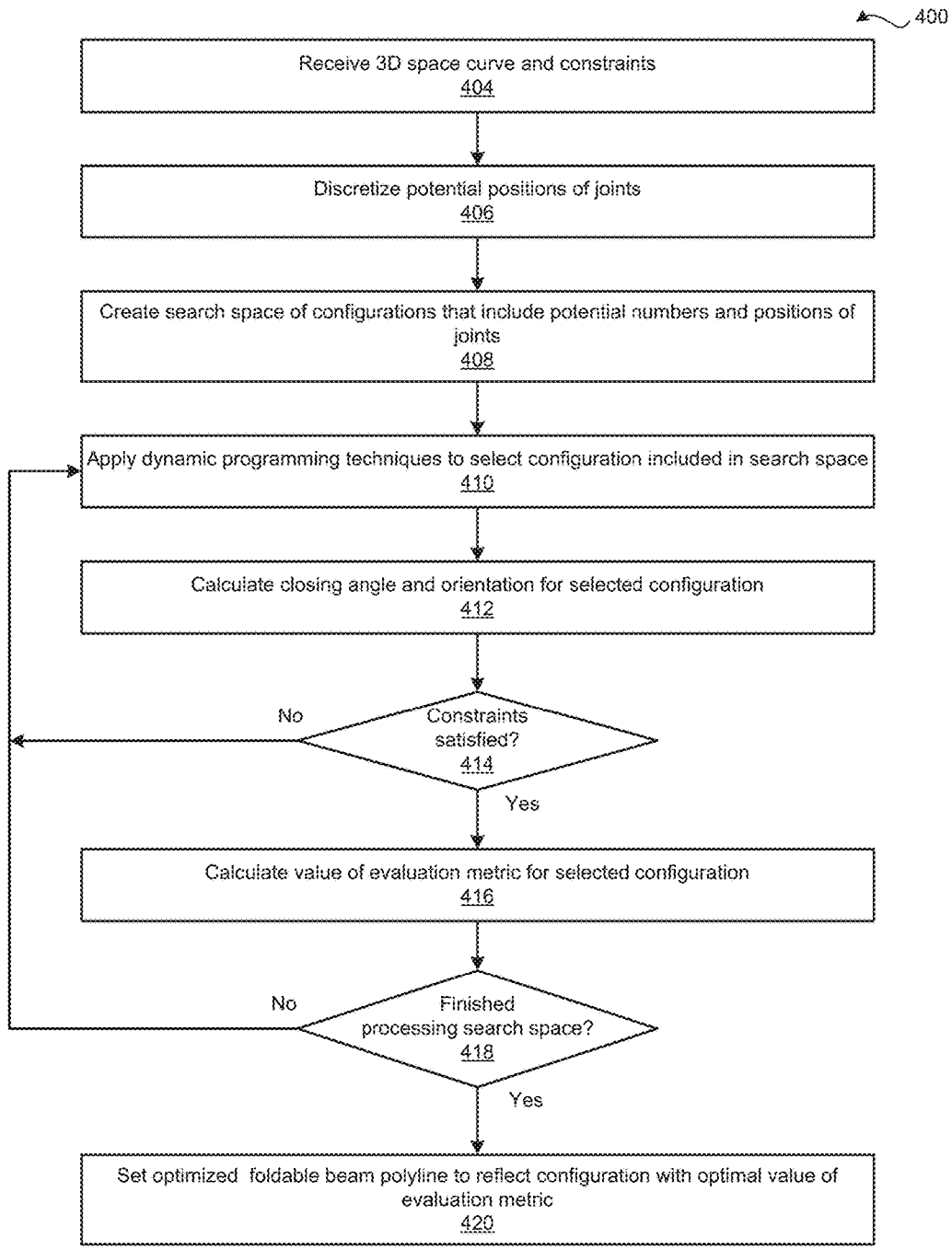
FIG. 4 is a flow diagram of method steps for generating a foldable beam polyline for constructing a three-dimensional (3D) object, according to various embodiments of the present invention.

FIG. 4 is a flow diagram of method steps for generating a foldable beam polyline for constructing a three-dimensional (3D) object, according to various embodiments of the present invention. Although the method steps are described with reference to the systems of FIGS. 1-3, persons skilled in the art will understand that any system configured to implement the method steps, in any order, falls within the scope of the present invention. The context of FIG. 4 is that the 3D object includes the 3D space curve 220, and the joint solver 230 is configured to generate the foldable beam polyline 260 as an optimized approximation to the 3D space curve 220. Notably, the joint solver 230 ensures that the foldable beam polyline 260 complies with manufacturing constraints associated with constructing the 3D object. The manufacturing constraints include the minimum joint spacing constraint 212 and the closing angle constraint 214.

As shown, a method 400 begins at step 404, where the joint solver 230 receives the 3D space curve 220, the minimum joint spacing constraint 212, and the closing angle constraint 214 from the foldable beam GUI 210. At step 406, the search space discretizer 240 generates a discretized set of potential positions 272 of the joints 270 based on the 3D space curve 220. The search space discretizer 240 may generate the potential positions 272 in any technically feasible fashion. For example, the search space discretizer 240 could perform sampling operations on the 3D space curve 220 to generate one hundred, equally spaced, potential positions 272 (1:100).

At step 408, the search space discretizer 240 generates a finite search space that includes a set of configurations, where each configuration that represents a combination of the acceptable number of the joints 270 and the potential positions 272. The search space discretizer 240 may determine the acceptable number of the joints 270 in any technically feasible fashion. For example, the search space discretizer 240 could implement a maximum number of the joints 270, and could implement an acceptable number of the joints 270 that ranges from 0 to the maximum number of the joints 270.

At step 410, the joint solver 230 applies dynamic programming techniques to select a configuration included in the search space. Again, the configuration includes a total number of the joints 270, and the positions 272 of each of the joints 270. At step 412, the tangent correspondence applier 242 computes a foldable beam polyline 260 based on the selected configuration. In particular, for each of the joints 270, the tangent correspondence applier 242 computes the orientation 274 and the closing angle 276 to approximate the 3D space curve 220 based on tangent correspondence.

At step 412, the compliance evaluator 244 determines whether the foldable beam polyline 260 complies with the minimum joint spacing constraint 212 and the closing angle constraint 214. If, at step 412, the compliance evaluator 244 determines that the foldable beam polyline 260 does not comply with the minimum joint spacing constraint 212 or the closing angle constraint 214, then the joint solver 230 no longer considers the selected configuration as a potential solution. The method 400 returns to step 410, where the joint solver 230 selects a different configuration included in the search space. The joint solver 230 continues in this fashion, cycling through steps 410-414, until the joint solver 230 determines that the foldable beam polyline 260 associated with the selected configuration complies with the minimum joint spacing constraint 212 and the closing angle constraint 214.

If, however, at step 414, the compliance evaluator 244 determines that the foldable beam polyline 260 complies with the minimum joint spacing constraint 212 and the closing angle constraint 214, then the method 400 proceeds to step 416. At step 416, the compliance evaluator 244 calculates the value of an evaluation metrics that reflects how closely the foldable beam polyline 260 associated with the selected configuration matches the 3D space curve 220. At step 418, the joint solver 230 determines whether the joint solver 230 has finished processing the search space as per the implemented dynamic programming techniques. If, at step 418, the joint solver 230 determines that the joint solver 230 has not finished processing the search space, then the method 400 returns to step 410 where the joint solver 230 selects a different configuration included in the search space. The joint solver 230 continues in this fashion, cycling through steps 410-418, until the joint solver 230 has finished processing all the configurations included in the search space.

If, however, at step 418, the joint solver 230 determines that the joint solver 230 has finished processing the search space, then the method 400 proceeds to step 420. At step 420, the joint solver 230 performs comparison operations to determine which of the foldable beam polylines 260 is associated with the optimal value of the evaluation metric. Notably, the joint solver 230 does not perform comparison operations for "invalid" configurations for which the foldable beam polyline 260 violates one or more of the minimum joint spacing constraint 212 and the closing angle constraint 214. The joint solver 230 sets the optimized foldable beam polyline 260 to the foldable beam polyline 260 that is associated with the optimal value of the evaluation metric, and the method 400 terminates.

In sum, the disclosed techniques may be used to fabricate complex 3D objects via physical deformation of simpler shapes. In general, portions of the complex 3D objects are modeled as 3D space curves, and a foldable beam generator approximates the 3D space curves as sets of planar beams and joints. The joints represent thin portions of the 3D object which, when heated, become dynamic hinges that close to a fixed angle based on the shape of the joints and the proximally located beams. When cooled, the joints become rigid. The foldable beam generator determines the number, positions, orientations, and closing angles of the joints to optimally approximate the 3D space curves while satisfying fabrication constraints, such as an acceptable opening angle range and a minimum distance between joints.

Advantageously, fabricating complex 3D objects as foldable beams that self-assemble into a final shape enable designers to efficiently create high-quality, complex 3D objects that may not be possible using standard manufacturing techniques. More specifically, when 3D printing foldable beams in a horizontal orientation with the joint openings upwards or downwards, support material is not required. Consequently, aesthetic flaws typically associated with the removal of support material are avoided. Further, when fabricating foldable beams with standard PVC piping using notch-cutting machines, the precision of the joints included in the foldable beams typically exceeds the precision of joints included in self-assembled objects that are created using conventional self-assembly techniques.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a foldable beam polyline for constructing a three-dimensional (3D) object, the method comprising:
    computing by at least one processor included in a computing device a first candidate foldable beam polyline that approximates a 3D curve included in the 3D object;
    verifying that the first candidate foldable beam polyline complies with a set of manufacturing constraints;
    computing by the at least one processor a second candidate foldable beam polyline that approximates the 3D curve;
    verifying that the second candidate foldable beam polyline complies with the set of manufacturing constraints;
    setting the foldable beam polyline equal to either the first candidate foldable beam polyline or the second candidate foldable beam polyline based on whether a difference between the first candidate foldable beam polyline and the 3D curve is less than a difference between the second candidate foldable beam polyline and the 3D curve; and
    after setting the foldable beam polyline equal to either the first candidate foldable beam polyline or the second candidate foldable beam polyline, causing the foldable beam polyline to be transmitted to a 3D printer for fabricating the 3D object.

2. The method of claim 1, wherein computing the first candidate foldable beam polyline comprises:
    generating a search space that includes a first set of joint positions;
    searching the search space to select the first set of joint positions; and
    generating the first candidate foldable beam polyline based on the first set of joint positions and the 3D curve.

3. The method of claim 2, wherein generating the first candidate foldable beam polyline comprises, for each of the joint positions included in the first set of joint positions, applying a tangent correspondence between the first candidate foldable beam polyline and the 3D curve to compute a closing angle and an orientation with respect to the first candidate foldable beam polyline.

4. The method of claim 2, wherein generating the search space comprises:
    sampling the 3D curve to generate potential joint positions; and
    generating a plurality of different sets of joint positions based on the potential joint positions, wherein each set of joint positions includes no more than a predetermined maximum number of potential joint positions.

5. The method of claim 1, wherein the set of manufacturing constraints includes at least one of a minimum joint spacing, a minimum closing angle, and a maximum closing angle.

6. The method of claim 1, further comprising determining the set of manufacturing constraints based on the capabilities of the 3D printer used to print the 3D object.

7. The method of claim 1, further comprising determining the set of manufacturing constraints based on at least one of the properties of PVC piping and the capabilities of a PVC piping cutting tool used to construct the 3D object.

8. The method of claim 1, further comprising computing the difference between the first candidate foldable beam polyline and the 3D curve based on an evaluation metric.

9. A non-transitory computer-readable storage medium including instructions that, when executed by a processor, cause the processor to generate a foldable beam polyline for constructing a three-dimensional (3D) object by performing the steps of:
    computing a first candidate foldable beam polyline that approximates a 3D curve included in the 3D object and complies with a set of manufacturing constraints;
    computing a second candidate foldable beam polyline that approximates the 3D curve and complies with the set of manufacturing constraints; and
    setting the foldable beam polyline equal to either the first candidate foldable beam polyline or the second candidate foldable beam polyline based on whether a difference between the first candidate foldable beam polyline and the 3D curve is less than a difference between the second candidate foldable beam polyline and the 3D curve; and
    after setting the foldable beam polyline equal to either the first candidate foldable beam polyline or the second candidate foldable beam polyline, causing the foldable beam polyline to be transmitted to a 3D printer for fabricating the 3D object.

10. The non-transitory computer-readable storage medium of claim 9, wherein computing the first candidate foldable beam polyline comprises:
    generating an initial foldable beam polyline based on a first set of joint positions;
    determining that the initial foldable beam polyline does not satisfy the set of manufacturing constraints;
    generating a subsequent foldable beam polyline based on a second set of joint positions; and
    determining that the subsequent foldable beam polyline satisfies the set of manufacturing constraints.

11. The non-transitory computer-readable storage medium of claim 10, wherein a number of joint positions included in the first set of joint positions does not equal a number of joint positions included in the second set of joint positions.

12. The non-transitory computer-readable storage medium of claim 9, further comprising computing the difference between the first candidate foldable beam polyline and the 3D curve based on an evaluation metric.

13. The non-transitory computer-readable storage medium of claim 12, wherein the evaluation metric comprises one of an average error or a maximum error.

14. The non-transitory computer-readable storage medium of claim 9, wherein computing the first candidate foldable beam polyline comprises:
    generating a search space that includes a first set of joint positions;
    searching the search space to select the first set of joint positions;

generating the first candidate foldable beam polyline based on the first set of joint positions and the 3D curve; and verifying that the first candidate foldable beam polyline complies with the set of manufacturing constraints.

15. The non-transitory computer-readable storage medium of claim 14, wherein generating the first candidate foldable beam polyline comprises, for each of the joint positions included in the first set of joint positions, applying a tangent correspondence between the first candidate foldable beam polyline and the 3D curve to compute a closing angle and an orientation with respect to the first candidate foldable beam polyline.

16. The non-transitory computer-readable storage medium of claim 9, further comprising determining the set of manufacturing constraints based on the capabilities of the 3D printer used to print the 3D object.

17. A system configured to generate a foldable beam polyline for constructing a three-dimensional (3D) object, the system comprising:

a memory storing a foldable beam application and a 3D model of the 3D object; and a processor coupled to the memory, wherein, when executed by the processor, the foldable beam application configures the processor to:

generate a first candidate foldable beam polyline based on a first set of joint positions and a 3D curve that is included in the 3D model;

verify that the first candidate foldable beam polyline complies with a set of constraints associated with constructing the 3D object;

generate a second candidate foldable beam polyline based on a second set of joint positions and the 3D curve;

verify that the second candidate foldable beam polyline complies with the set of constraints;

set the foldable beam polyline equal to either the first candidate foldable beam polyline or the second candidate foldable beam polyline based on whether a difference between the first candidate foldable beam polyline and the 3D curve is less than a difference between the second candidate foldable beam polyline and the 3D curve; and after setting the foldable beam polyline equal to either the first candidate foldable beam polyline or the second candidate foldable beam polyline, causing the foldable beam polyline to be transmitted to a 3D printer for fabricating the 3D object.

18. The system of claim 17, wherein the foldable beam application further configures the processor to determine the set of constraints based on the capabilities of the 3D printer used to print the 3D object.

19. The system of claim 17, wherein the foldable beam application further configures the processor to determine the set of constraints based on at least one of the properties of PVC piping and the capabilities of a PVC piping cutting tool used to construct the 3D object.

20. The system of claim 17, wherein generating the first candidate foldable beam polyline comprises, for each of the joint positions included in the first set of joint positions, applying a tangent correspondence between the first candidate foldable beam polyline and the 3D curve to compute a closing angle and an orientation with respect to the first candidate foldable beam polyline.

* * * * *